Oct. 2, 1956
G. N. SMITH
2,764,911
REEL ADVANCER FOR PROJECTOR
Filed Jan. 12, 1953
9 Sheets-Sheet 1
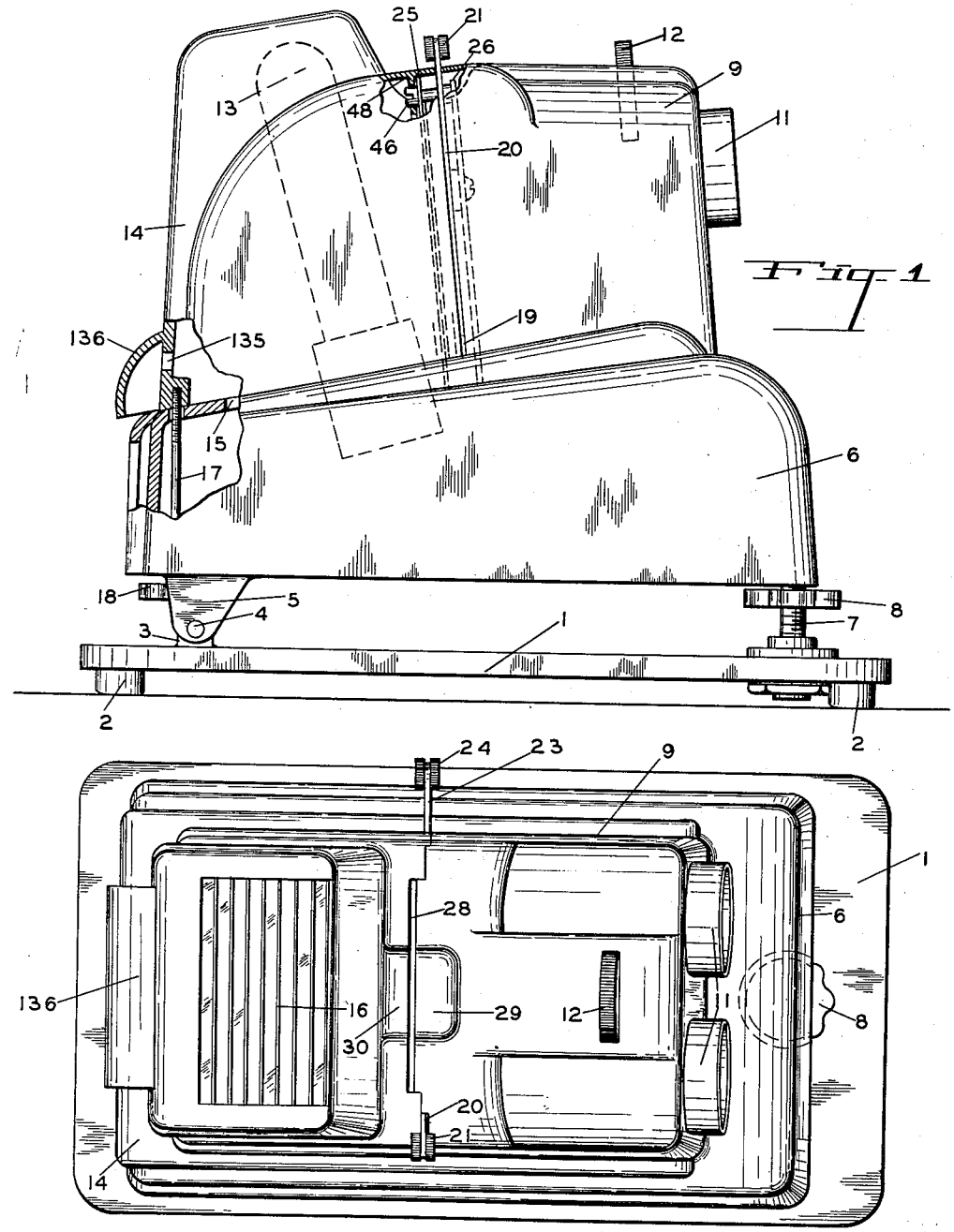
*INVENTOR.*
GORDON N. SMITH
BY
Buckhorn and Cheatham
ATTORNEY Oct. 2, 1956 G. N. SMITH 2,764,911
REEL ADVANCER FOR PROJECTOR
Filed Jan. 12, 1953 9 Sheets-Sheet 2

INVENTOR.
GORDON N. SMITH
BY Buckhorn and Cheatham
ATTORNEY

Oct. 2, 1956　　　　G. N. SMITH　　　　2,764,911
REEL ADVANCER FOR PROJECTOR
Filed Jan. 12, 1953　　　　　　　　　　　　　　9 Sheets-Sheet 3
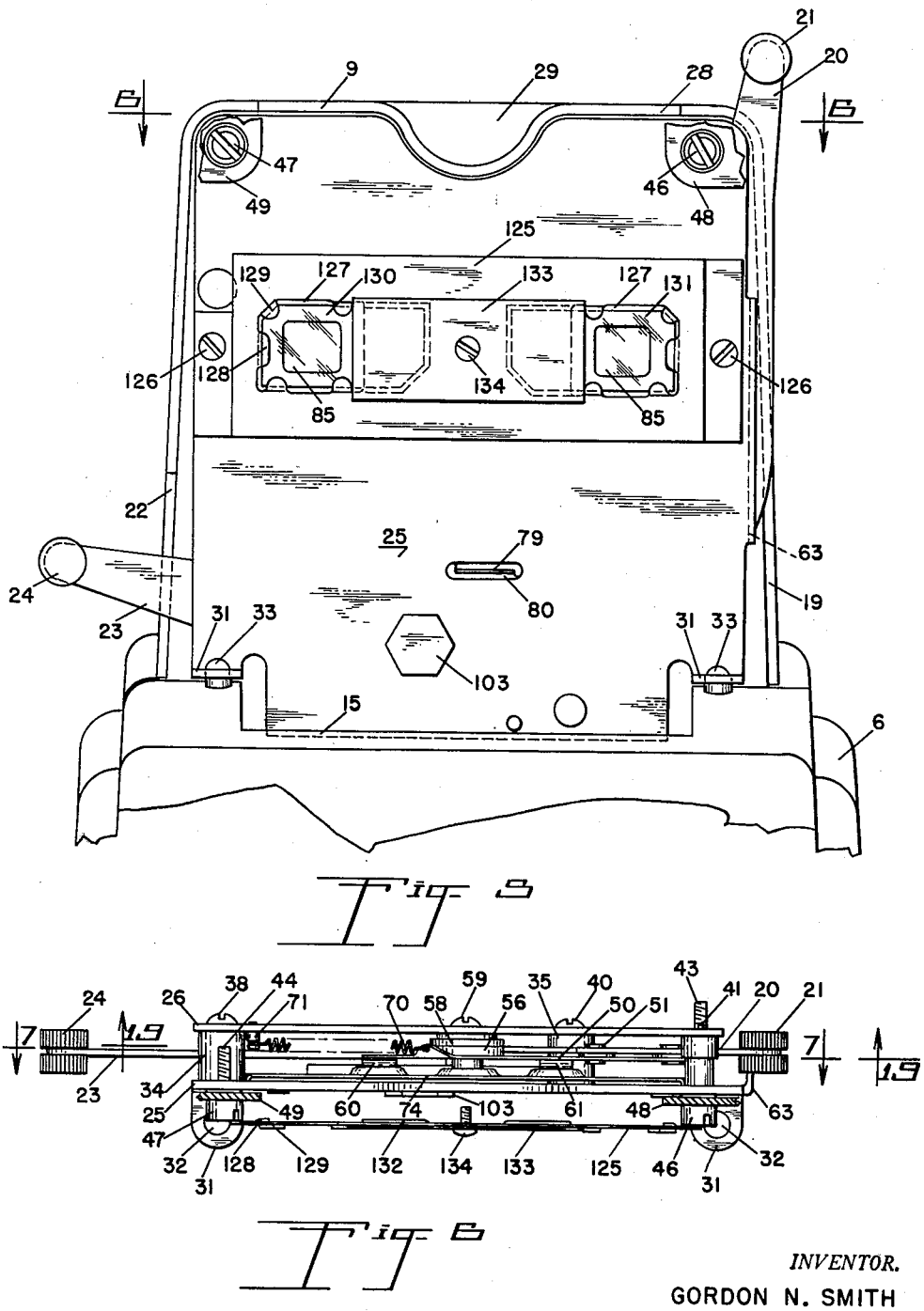
INVENTOR.
GORDON N. SMITH
BY
Buckhorn and Cheatham
ATTORNEY Oct. 2, 1956    G. N. SMITH    2,764,911
REEL ADVANCER FOR PROJECTOR
Filed Jan. 12, 1953    9 Sheets-Sheet 4

INVENTOR.
GORDON N. SMITH
BY
Buckhorn and Cheatham
ATTORNEY

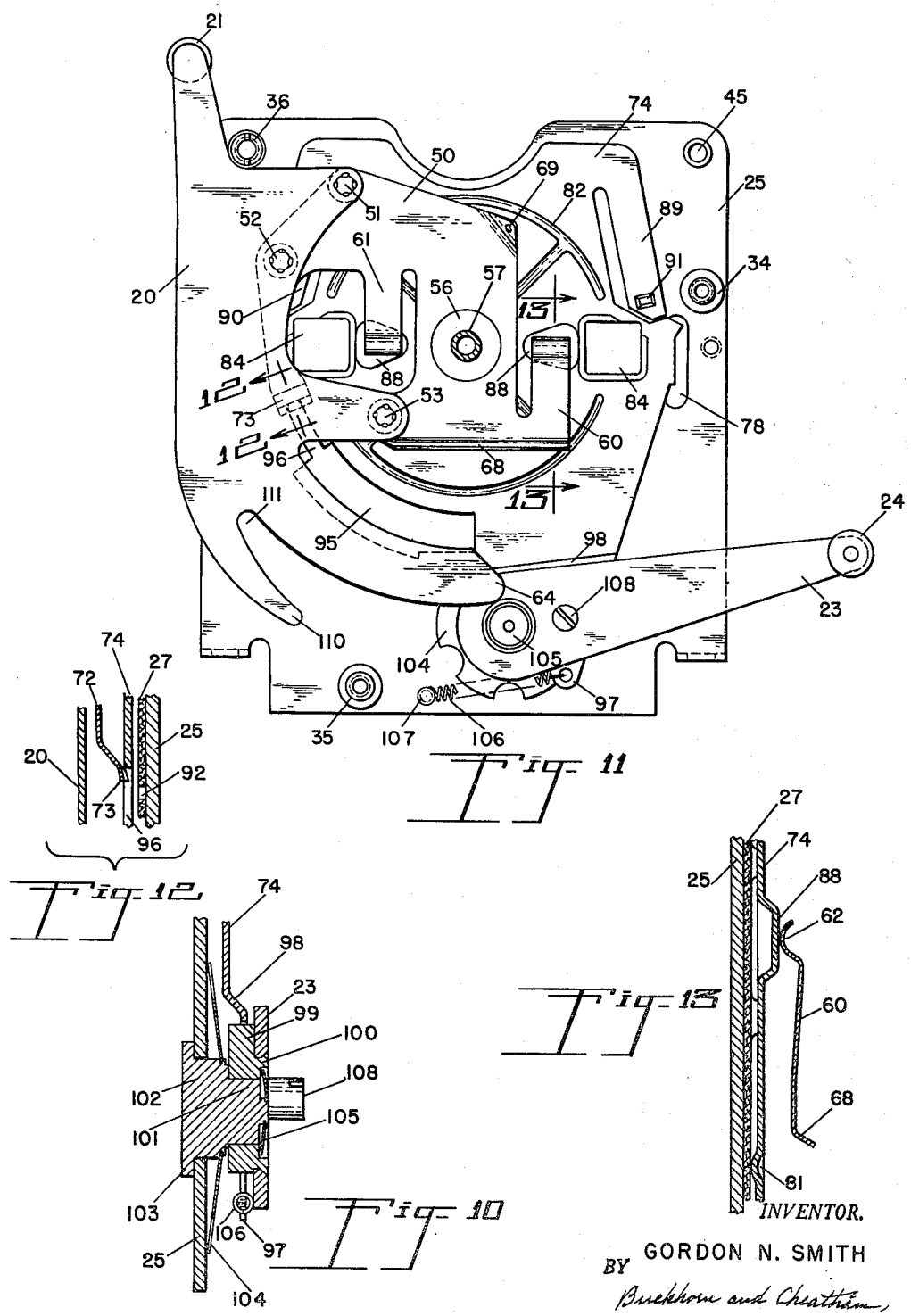

Oct. 2, 1956        G. N. SMITH        2,764,911
REEL ADVANCER FOR PROJECTOR

Filed Jan. 12, 1953        9 Sheets-Sheet 6

INVENTOR.
GORDON N. SMITH
BY
Buckhorn and Cheatham
ATTORNEY

INVENTOR.
GORDON N. SMITH
BY
Buckhorn and Cheatham
ATTORNEY

Oct. 2, 1956          G. N. SMITH          2,764,911
REEL ADVANCER FOR PROJECTOR
Filed Jan. 12, 1953          9 Sheets-Sheet 8
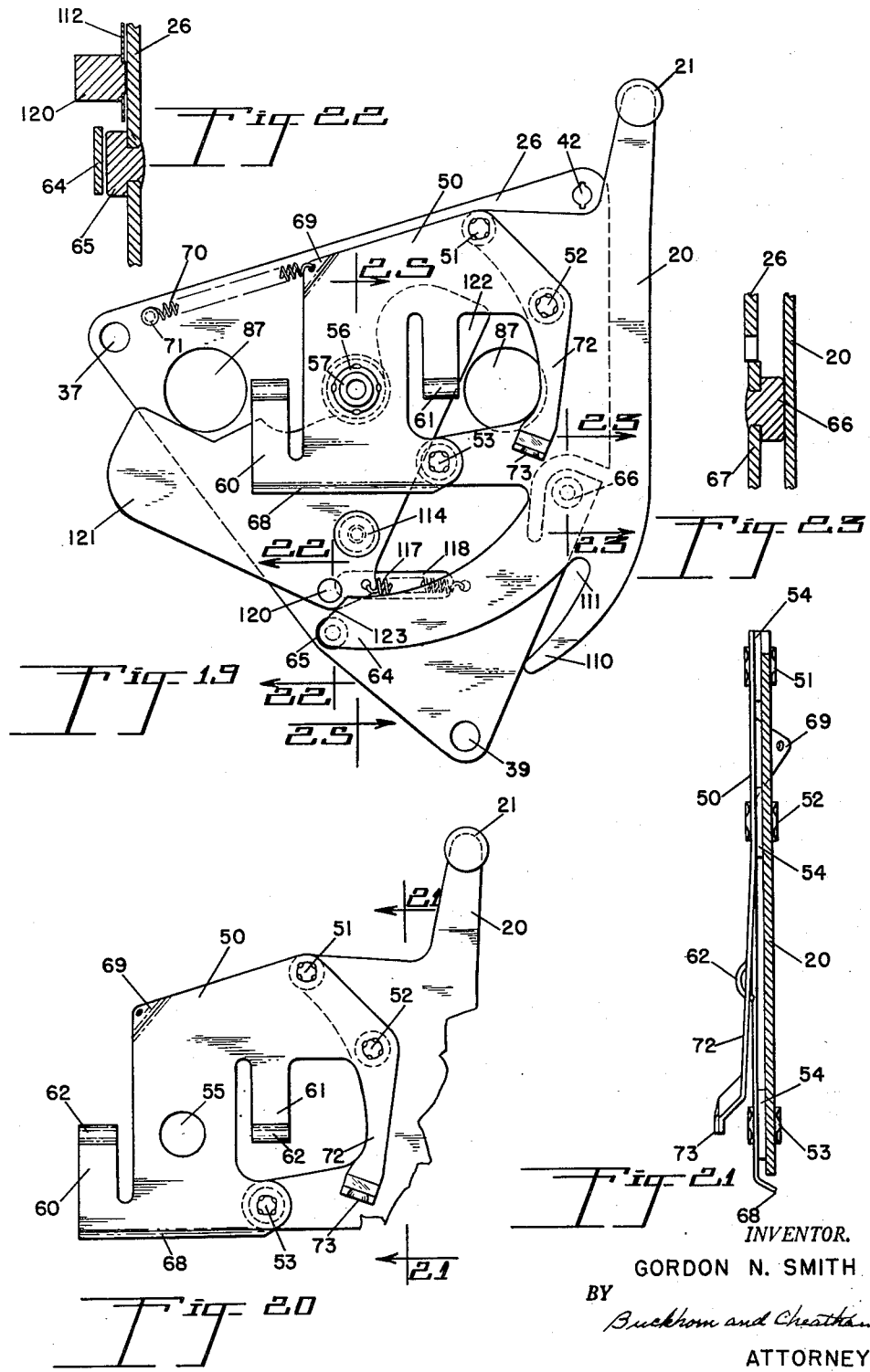
INVENTOR.
GORDON N. SMITH
BY
Buckhorn and Cheatham
ATTORNEY Oct. 2, 1956  G. N. SMITH  2,764,911
REEL ADVANCER FOR PROJECTOR
Filed Jan. 12, 1953  9 Sheets-Sheet 9

INVENTOR.
GORDON N. SMITH
BY Buckhorn and Cheatham
ATTORNEY

United States Patent Office 2,764,911
Patented Oct. 2, 1956

2,764,911

REEL ADVANCER FOR PROJECTOR

Gordon N. Smith, Portland, Oreg., assignor to Sawyer's Inc., Portland, Oreg., a corporation of Oregon Application January 12, 1953, Serial No. 330,618

21 Claims. (Cl. 88—27)

My present invention comprises an improvement in a transparency-holding reel advancing mechanism for a stereoscopic projector. The object of the present invention is to provide means for accurately positioning paired stereoscopic transparencies for projection in proper registry with each other for stereoscopic viewing. The projector in which the present invention is incorporated comprises means for projecting the images of a pair of transparencies upon a viewing screen, such means including polarizing filters whereby the light creating one image is polarized in one direction and the light creating the other image is polarized in a second direction, the resulting images being in proper registry for viewing through spectacles having correspondingly polarized lenses whereby each eye sees only one view and the resulting impressions are transposed into a three-dimensional effect in the visual system of the observer. In such devices it is extremely important that the views be in exact registry in the vertical sense, otherwise severe eyestrain may result. It is not so important that the views be exactly registered in the horizontal sense, since the eyes are accustomed to diverging or converging as the point of vision shifts from foreground to background or vice versa. However, the eyes are accustomed to seeing a three-dimensional object simultaneously, the object being obviously in the same position whether viewed by the right eye alone or the left eye alone or both. Accordingly, it is important that vertical registry of the superimposed views on the screen should be achieved, otherwise the eyes attempt to adjust themselves in a manner which is physically impossible, resulting in a distorted or blurred image and eyestrain due to the muscles attempting to do something impossible for them to achieve. The object of the present invention is to provide means for adjusting the relative position of the superimposed images in the vertical sense.

The reason for the present invention is that even though provision is made in holders or mounting plates for pairs of stereoscopic transparencies to mount them in exactly proper relation for stereoscopic viewing, it is impossible to achieve this result in all cases, or to hold the relative positions of the transparencies at all times. The projector of the present invention is designed for use with transparencies mounted in disclike holders, such as disclosed and claimed in the patent to Gruber, 2,189,285, February 6, 1940, and the patent to Kurz, 2,571,584, October 16, 1951. The holders disclosed in the patent to Gruber comprise a pair of superimposed fiber discs, which positively grip the edges of the transparencies mounted therebetween. Such holders may be purchased throughout the world and carry transparencies depicting items of general interest, the holders having been manufactured and assembled with the transparencies in assembling machines which maintain the views in exactly proper relation to each other. However, in spite of the best precautions which can be taken, the transparencies might be slightly out of registry initially and, as the holders become worn through constant use, might develop such inaccuracies. Another cause of difficulty is that constant exposure to dry atmosphere might result in shrinkage of the fiber discs, or to a moist atmosphere might result in swelling of the fiber discs. In the patent to Kurz the reel is provided with peripherally open pockets into which the transparencies are slipped, thus making it possible for the amateur photographer to assemble his own reels of views of personal interest to him. In such a device despite the greatest precautions in accurately manufacturing the reels, in punching the stereo-paired transparencies from a film strip, and in inserting them in the reel, the transparencies may be slightly out of registry with each other. This may be occasioned by slight manufacturing irregularities, by rough edges on the transparencies, by foreign material collecting in the pockets of the reel, or by carelessness in inserting the transparencies in the pockets of the reel. Likewise, as the edge of the reel becomes worn through constant use, or as swelling or contraction takes place by long exposure to some types of atmosphere, initially correct registry might be lost. The present invention eliminates this difficulty by providing means for individually adjusting the relative position of the pairs of transparencies in the vertical sense by means associated with the reel advancing mechanism.

A further object of the present invention is to provide mechanism of the foregoing type with means whereby the adjusting mechanism is automatically returned to a neutral position at each advancing movement of the reel, since no two pairs on a single reel will be out of registry to exactly the same amount.

The foregoing and other objects and advantages of the present invention will be more readily understood by reference to the following specification taken in connection with the accompanying drawings wherein like numerals refer to like parts throughout.

In the drawings,

Fig. 1 is a side elevation of a projector incorporating the present invention;

Fig. 2 is a plan view of the projector;

Fig. 5 is a rear elevation of the present invention mounted in the projector, with the cover portion of the projector and associated mechanism removed;

Fig. 6 is a plan view of the present invention removed from the projector, looking down substantially from the plane of the line 6—6 in Fig. 5;

Fig. 10 is a vertical section taken substantially along line 10—10 of Fig. 7, the view being enlarged;

Fig. 11 is a view corresponding to Fig. 7 but with a reel advancing lever and associated parts assembled thereon, the lever being shown in its normal position;

Fig. 12 is a vertical section, on an enlarged scale, taken substantially along line 12—12 of Fig. 11;

Fig. 13 is a vertical section, on an enlarged scale, taken substantially along line 13—13 of Fig. 11;

Fig. 19 is a view in elevation taken substantially along the line 19—19 of Fig. 6, the view illustrating the feeding lever and associated parts and the shutter mounted upon a triangular mounting plate;

Fig. 20 is a partial view of the feeding lever and associated parts;

Fig. 21 is a vertical section, on an enlarged scale, taken substantially along line 21—21 of Fig. 20;

Fig. 22 is a vertical section, on an enlarged scale, taken substantially along line 22—22 of Fig. 19;

Fig. 23 is a vertical section, on an enlarged scale, taken substantially along line 23—23 of Fig. 19;

Figure 3:
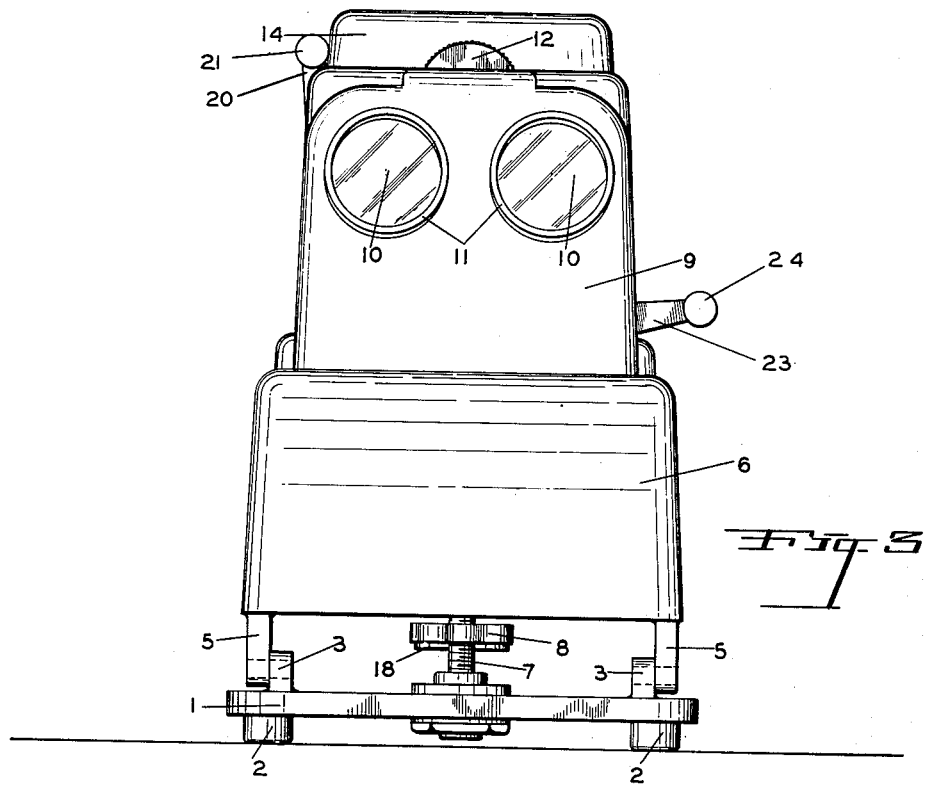
Fig. 3 is a front elevation of the projector.

The present invention is illustrated in a stereoscopic projector comprising a base plate 1 supported on a plurality of rubber feet 2. A pair of ears 3 project upwardly from the rear of the base plate and support aligned, horizontal pivots 4 which engage downwardly projecting ears 5 at the base of the housing 6 of the projector. An adjusting screw 7 provided with a thumb wheel 8 is rotatably mounted at the front of the base plate and engages the forward portion of the housing 6 whereby the housing may be pivoted about the pivots 4 to raise or lower the beams of light therefrom in the usual manner. An integral portion 9 of the housing extends upwardly and mounts a laterally spaced pair of adjustable lens assemblies (not shown) in alignment with fixed lenses 10 mounted in forwardly projecting lens holders 11. A knurled lens adjusting wheel 12 projects upwardly through an opening in the top of the housing portion 9 and may be manually rotated to adjust the lenses for proper focusing of the images on the screen. A suitable form of adjustable lens assembly is illustrated, described and claimed in the copending application of Wilhelm B. Gruber, Serial No. 147,305, filed March 2, 1950, now Patent No. 2,700,322, issued January 25, 1955. A beam of light produced by an incandescent bulb 13 suitably mounted in the housing 6 is directed through each of the lens assemblies and lenses 10 by suitable means (not shown) such as illustrated, disclosed and claimed in the patent to Gruber, No. 2,525,598, issued October 10, 1950. The bulb and associated mechanism are enclosed within a removable casing portion 14 mounted on the rear of the housing 6, the forward edge of the portion 14 and the rear edge of the portion 9 interlocking as seen most clearly in Fig. 2. The lower edge of the portion 14 rests upon an inwardly turned flange 15 on the housing 6. It is to be appreciated that the housing 6 is at least partially open at the bottom so that cooling air may enter the projector and be ejected upwardly through a light-trapping louver 16 at the top of the portion 14, preferably a motor-driven blower (not shown) being provided to create forced draft for cooling the bulb and preventing overheating of the transparencies. The removable cover portion 14 is maintained in position by a screw 17 rotatably and slidably mounted in the housing 6 and adapted to engage a threaded opening in the base of the cover portion 14, the screw being provided with an accessible thumb wheel 18 between the pivots 4.

Figure 7:
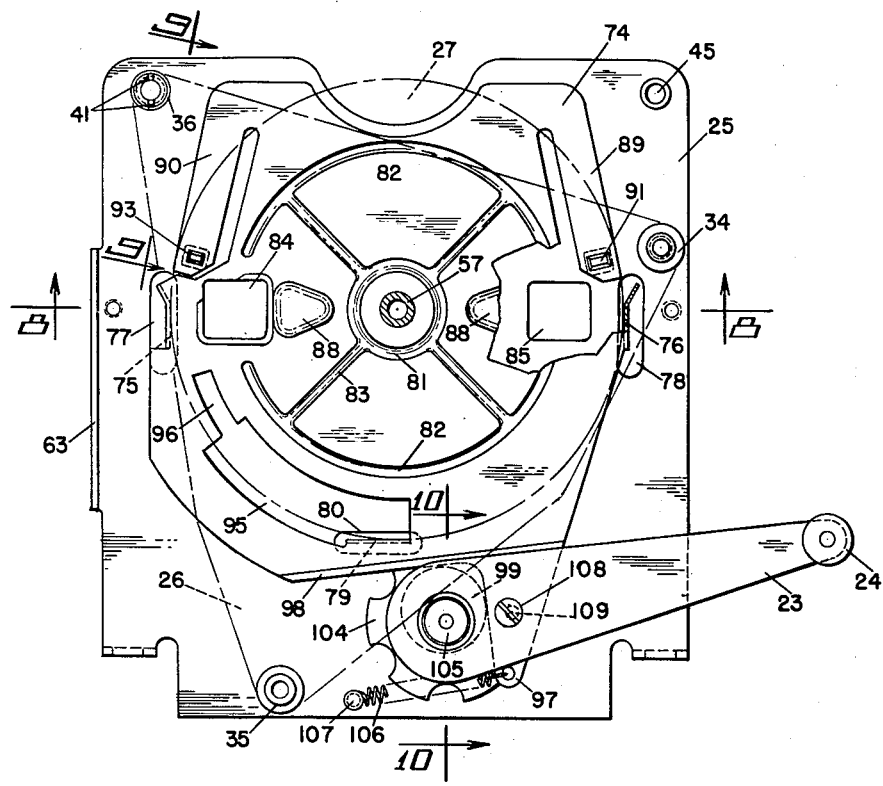
Fig. 7 is a front elevation of a portion of the mechanism, taken substantially along the line 7—7 of Fig. 6, parts of the mechanism having been removed so that a rectangular mounting plate and a reel clamping plate together with the adjustment means therefor are viewed.

Portions of the forward edge of the cover portion 14 and the rear edge of the portion 9, extending both in the longitudinal and the lateral sense, engage each other so as to maintain the cover portion 14 in proper position. Portions of the edges are recessed as follows: At the right side of the projector an elongated, vertical slot 19 is provided, the slot running from the top of the projector to the base of the cover portion at the flange 15. A reel shifting lever 20 provided with a thumb-engaging knob 21 projects through the slot 19, the lever normally resting in the position illustrated in Figs. 5 and 11. At the opposite side of the housing a vertical slot 22 is provided, the slot running from the flange 15 upwardly part way of the height of the cover portion. A reel adjusting lever 23 provided with a thumb-engaging knob 24 projects laterally through the slot 22, this lever normally resting in the position illustrated in Figs. 5, 7 and 17. The reel shifting lever 20 is moved from the rest position illustrated in Fig. 5 to its fully advanced position illustrated in Fig. 17 at each reel advancing operation in order to change scenes. The reel adjusting lever 23 normally rests in the neutral position illustrated in Fig. 7 but may be moved in either direction to adjust the relative positions of the images on the screen when the reel shifting lever is returned to its rest position. Means are provided whereby the reel adjusting lever is returned to its neutral position at each reel advancing movement. The two levers are pivotally mounted in a reel advancing assembly including a rectangular rear mounting plate 25 (Fig. 5) and a triangular, forward mounting plate 26 (Fig. 19). A transparency mounting reel 27 may be inserted in the assembly into operative relationship with the mechanism controlled by the two levers through a horizontal slot 28 provided by spaced portions of the adjacent upper edges of the portions 9 and 14 of the housing. The housing portion 9 is provided with a central depression 29 adjacent its rear edge, and the cover portion 14 is provided with a central depression 30 adjacent its forward edge, the two depressions complementing each other to provide a recess at the top of the projector through which the upper portion of a reel mounted therein projects, whereby the reel may be grasped in order to remove it from the projector.

The reel holding and feeding assembly is removably mounted in the housing as follows: A pair of rearwardly directed feet 31 are provided at the lower corners of the rectangular mounting plate 25, each foot being provided with an aperture 32. A pair of rounded, vertical pins 33 are provided at the forward extremities of the flange 15 on the housing 6, the pins being snugly receivable in the apertures 32. The triangular mounting plate is mounted on the rectangular mounting plate in the position indicated in broken outline in Fig. 7, by suitable means including internally threaded spacers 34, 35 and 36, which are riveted to the rectangular plate 25 and project forwardly therefrom. The outer end of the spacer 34 is provided with a reduced portion which engages in an aperture 37 in the triangular plate, and a screw 38 holds the assembly together at this point. The outer end of the spacer 35 is likewise provided with a reduced portion engageable in an aperture 39 in the triangular plate and a screw 40 holds the assembly together at this point. The spacer 36 is provided with a pair of longitudinally projecting keys 41 which engage machined notches in the edge of an aperture 42 in the triangular mounting plate, thus accurately locating the mounting plate. The keys 41 project beyond the triangular plate 26 and engage an accurately located recess (not shown) on the housing portion 9 to aid in positioning the assembly in the projector. A long-stemmed screw 43 passes freely through the central bore of the spacer 36 and engages a threaded opening (not shown) in the housing portion 9. A short screw 44 passes freely through an aperture 45 in the opposite corner of the rectangular plate 25 and is threadedly engaged in a threaded opening (not shown) in the housing portion 9. The screws 43 and 44 have elongated, cylindrical heads 46 and 47, respectively, which are received in accurately defined apertures in a pair of lugs 48 and 49, respectively, which project downwardly from the forward portion of the cover portion 14, thereby holding the assembly accurately in position.

Figures 24, 25:
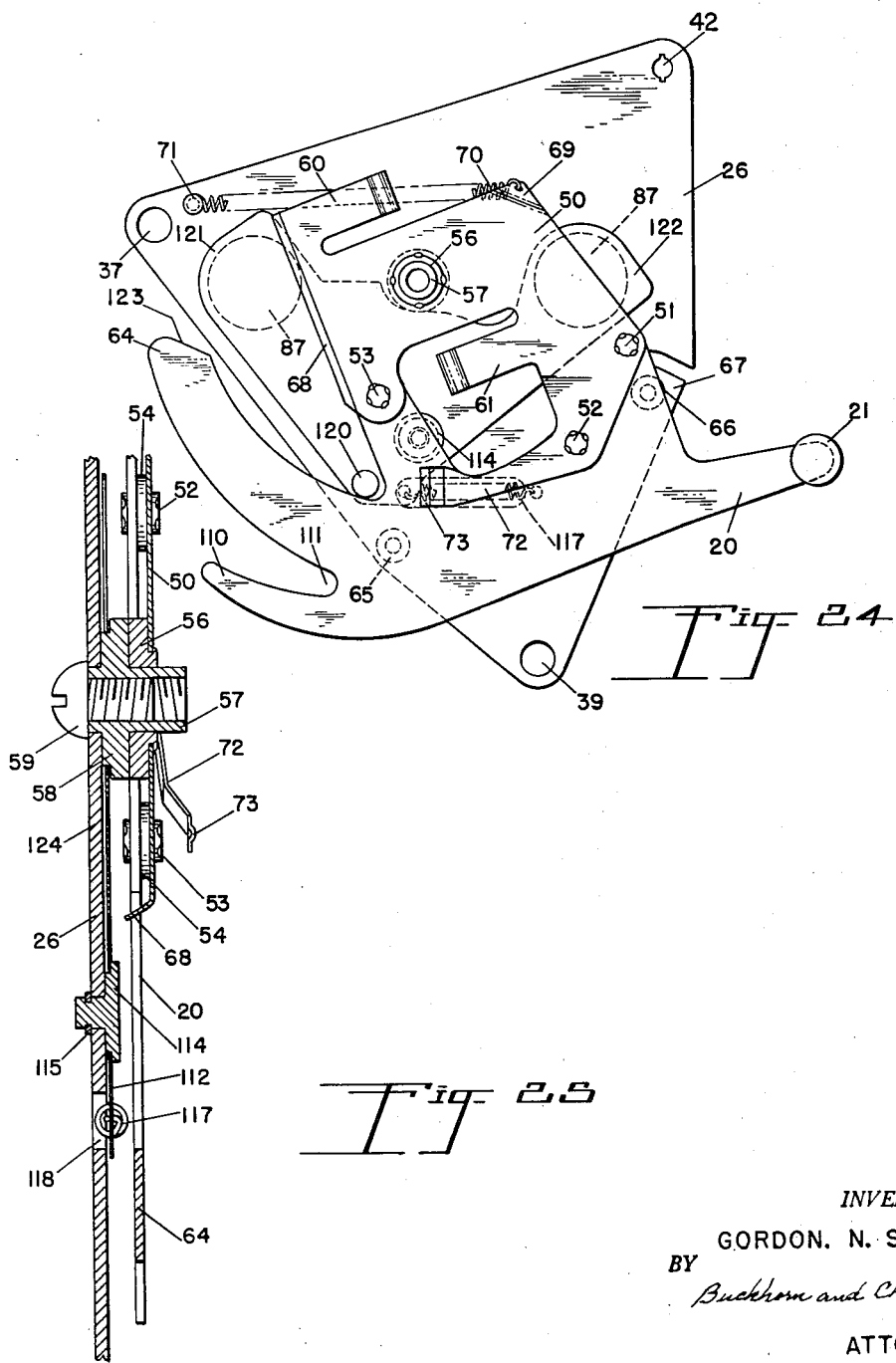
Fig. 24 is a view corresponding to Fig. 19 showing the feeding lever at the limit of its feeding movement and the shutter in lens-obscuring position.
Fig. 25 is a vertical section, on an enlarged scale, taken substantially along line 25—25 of Fig. 19.

The film advancing lever 20 is pivotally mounted in the assembly by means including a spring plate 50 fastened to the lever by rivets 51, 52 and 53, the spring plate being maintained parallel to and spaced from the plane of the lever 20 by spacers indicated at 54 in Fig. 25. The spring plate 50 is provided with an aperture 55 (Fig. 20) into which is fitted a reduced portion of a bearing collar 56 (Fig. 25), the collar having a thin flange which is rolled over the outer surface of the spring plate and peened so as to prevent slippage as indicated in Fig. 19. The bearing collar is journaled on a reduced pivot portion 57 of a spacer 58 which is maintained against the triangular mounting plate 26 by a screw 59 having its stem threadedly engaged in an internally threaded passage through the spacer. The spacer 58 is provided with an oppositely extending, reduced portion which passes through a locating opening in the plate 26 so that the pivot 57 is accurately located with respect to the assembly.

The spring plate 50 is of irregular shape so as to provide an upwardly projecting spring finger 60 at one side of the assembly and a downwardly projecting spring finger 61 at the opposite side of the assembly. The free end of each of the fingers is provided with a rounded cam tip such as indicated at 62 in Fig. 13, the tips bulging rearwardly toward the rectangular mounting plate 25, and being located diametrically opposite each other along a horizontal diameter of the pivot 57 when the lever 20 is in normal position as seen in Fig. 11.

The lever 20 is maintained parallel to the front and rear mounting plates by means including a vertical flange 63 on plate 25. A lower tip portion 64 of the lever also engages the forward surface of the lever 23. The opposite surface of the portion 64 is guided by the head of a spacer rivet 65 projecting rearwardly from the triangular mounting plate 26 (Fig. 22), and an intermediate portion of the lever 20 is closely adjacent to and guided by a second spacer rivet 66 mounted on the opposite edge of the mounting plate 26 (Fig. 23). The spacer rivet 66 is preferably mounted on a tongue 67 provided by slotting the mounting plate whereby the rivet can be displaced during factory assembly as indicated in Fig. 23 so as accurately to position the lever.

The lower edge of the spring plate 50 is provided with a flange 68 for stiffening purposes and an upper corner of the spring plate is bent rearwardly to provide a spring anchoring ear 69 having an aperture therethrough for engagement of the hooked end of a spring 70, the opposite end of which is anchored to a pin 71 projecting rearwardly from the plate 26. The spring 70 contracts to raise the shifting lever 20 as seen in Fig. 19 and is stretched when the lever is depressed as seen in Fig. 24, whereby the shifting lever 20 is urged toward its position of rest upon being released after each advancing movement. The spring plate is provided with a rearwardly directed, resilient reel shifting finger 72 which terminates in a rearwardly displaced claw 73.

Figure 8:
Fig. 8 is a horizontal section taken from the plane of the line 8—8 of Fig. 7.

The reel 27 is slipped through the slot 28 in the top of the housing between the rear mounting plate 25 and a clamping plate 74 which is provided with a central aperture into which the reduced portion 57 of the member 56 projects (Fig. 8) whereby the clamping plate is pivotally mounted and may move forwardly or rearwardly in the assembly. The clamping plate is provided with a pair of horizontally opposite, vertically disposed flanges 75 and 76 on the opposite edges thereof which project into relatively wider and longer slots 77 and 78, respectively, in the mounting plate 25. The lower edge of the clamping plate is provided with a horizontal flange 79 which projects into a relatively wider and longer slot 80 in the mounting plate 25. The upper ends of the vertical flanges 75 and 76 are directed outwardly to form guides for directing the reel into concentric relation to the clamping plate 74, and the horizontal flange 79 provides a stop against which the lower edge of the reel comes to rest. It is to be appreciated that the flanges 75, 76 and 79 are rough locators, the reel having some play therebetween since the edge of the reel might become worn from continuous use and hence cannot be depended upon as an accurate locating means. The amount of fore and aft movement of the clamping plate 74 is such that the flanges always engage the edge of a reel to prevent it from dropping through the assembly.

The clamping plate 74 is provided with inner and outer concentric ridges 81 and 82 connected by a plurality of radial ridges 83, the ridges stiffening the plate and providing reduced friction surfaces against which the reel rotates. The clamping plate 74 is provided with a spaced pair of windows 84 on the horizontal diameter of the pivot 57 which register with similar windows 85 in the mounting plate 25. Each of the windows 84 is partially surrounded by a reel-engaging clamping flange, except at the upper, outer corners thereof. The centers of the windows 84 and 85 are substantially along a horizontal diameter through the pivot 57 and are spaced apart by the distance between the centers of a pair of transparency mounting apertures 86 in the reel 27, whereby light may be directed through the transparencies and into the lens systems for projecting the images. Likewise, the triangular mounting plate 26 is provided with a pair of aligned windows 87. When the lever 20 is in its normal position, as seen in Fig. 11, the aligned apertures are not blocked by any part of the lever 20 or of the attached spring plate 50.

Figure 9:
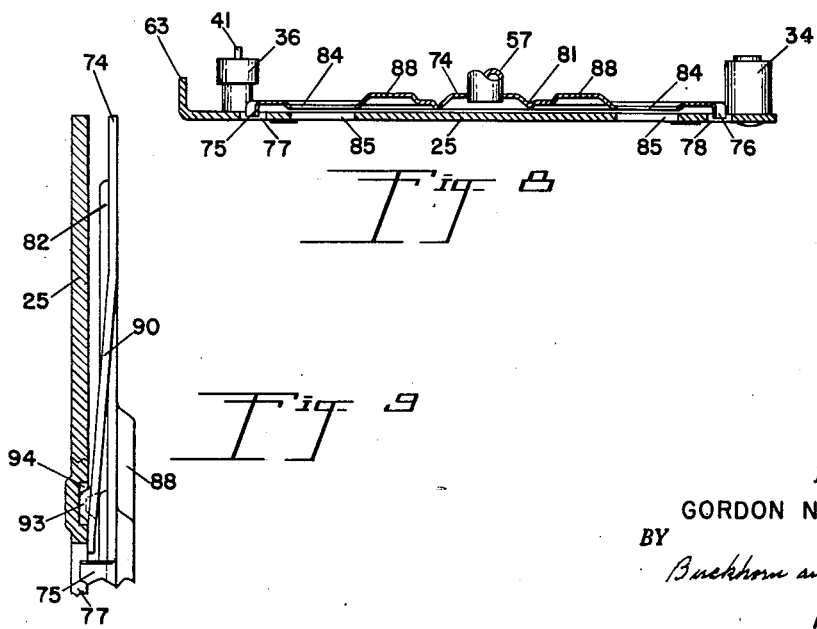
Fig. 9 is a vertical section taken substantially along line 9—9 of Fig. 7, the view being on an enlarged scale.
Figure 14:
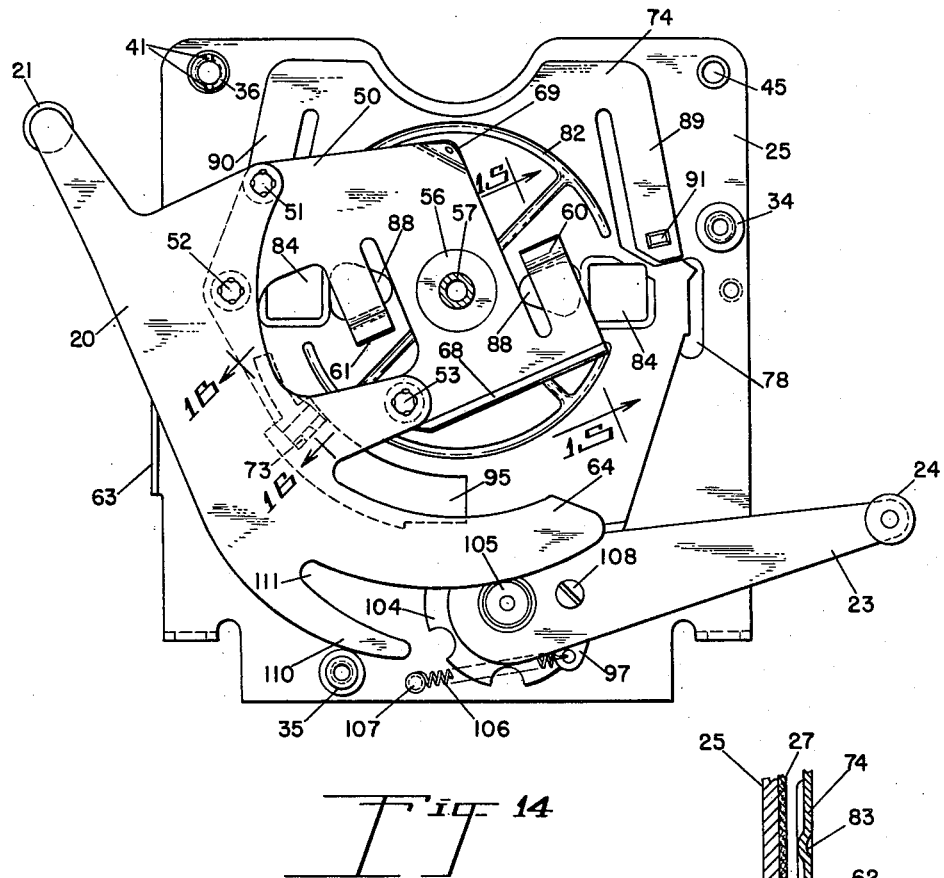
Fig. 14 is a view corresponding to Fig. 11 showing the reel advancing lever at the point in its movement when release of clamping pressure on the reel is effected.
Figure 16:
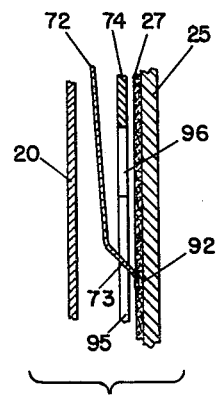
Fig. 16 is a vertical section, on an enlarged scale, taken substantially along line 16—16 of Fig. 14.
Figure 15:
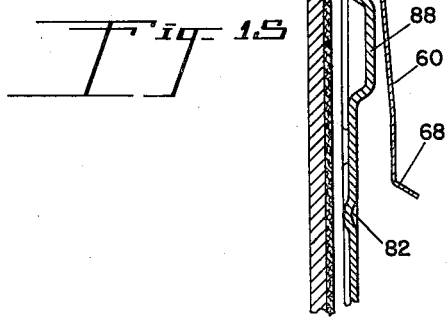
Fig. 15 is a vertical section taken substantially along line 15—15 of Fig. 14, on an enlarged scale.

The clamping plate 74 is provided with a pair of rounded, forwardly directed protrusions 88 immediately adjacent the windows 84 and on the same horizontal diameter. These protrusions are engageable by the rounded tips 62 of the spring plate fingers when the lever 20 is at its normal position illustrated in Fig. 11, whereby the clamping plate 74 is resiliently pressed into clamping engagement with the reel to hold it stationary against the smooth inner surface of the mounting plate 25, as seen in Fig. 13. When the lever 20 has been slightly depressed, as seen in Fig. 14, the tips 62 ride off of the protrusions 88, thus relieving pressure against the reel so that it may be rotated stepwise between the mounting plate 25 and the clamping plate 74, the clearance provided being illustrated in Fig. 15. The clamping plate is urged away from the mounting plate 25 by a pair of spring locating fingers 89 and 90 projecting downwardly on opposite sides of the clamping plate 74 to a point immediately adjacent the upper, outer corners of the windows 84, this being as close to the horizontal diameter as the fingers may project and still function. The tip of finger 89 is provided with a locating lug 91 of exact size firmly to engage the feeding apertures 92 in the reel 27, and the tip of the finger 90 is provided with a somewhat similar lug 93 of the same breadth as the feeding apertures 92 but of lesser width so as to clear both ends of the greater dimension of the apertures. As seen in Fig. 9 the lugs 91 and 93 project rearwardly into embossed depressions 94 in the mounting plate 25 so that the lugs will project completely into the feeding apertures 92 without interference from the mounting plate. The side surfaces of the lugs are inclined so that when a reel 27 is inserted the fingers 90 will be pushed out of the way to permit the reel to be fully seated. It is to be appreciated that the spring fingers 60 and 61, when the rounded ends 62 are in engagement with the elevations 88, exert greater force tending to clamp the plate than the fingers 89 and 90 exert in the opposite direction.

Figure 17:
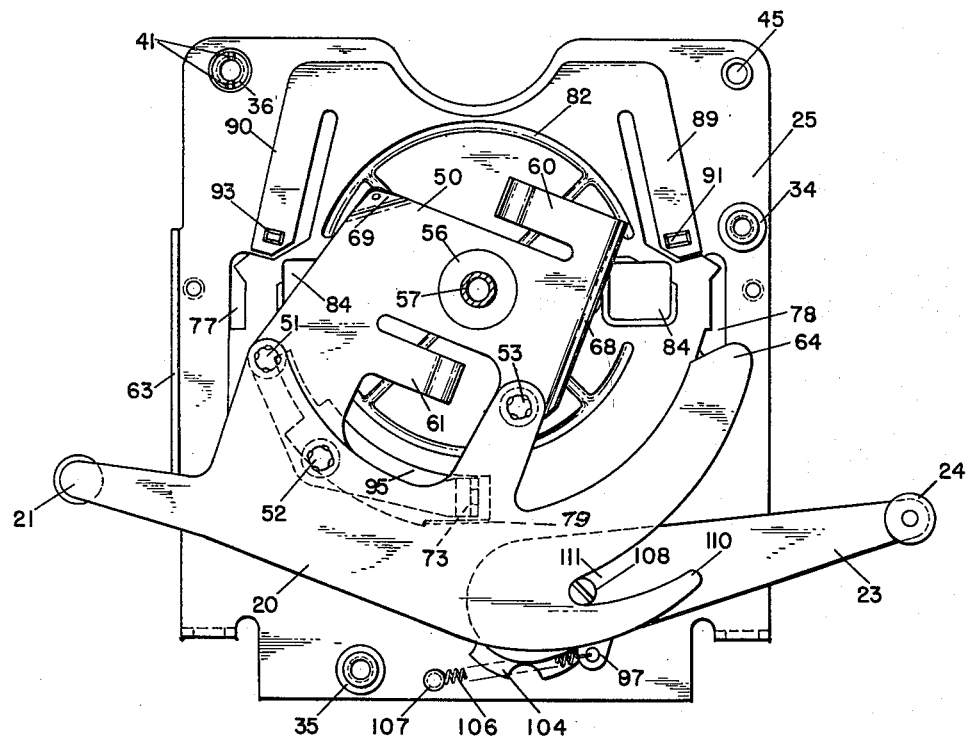
Fig. 17 is a view corresponding to Figs. 11 and 14 showing the reel advancing lever and associated parts at the extreme limit of the reel advancing movement, and illustrating the manner in which the adjusting means is returned to a neutral position.

A lower portion of the clamping plate 74 is provided with a concentric, arcuate, relatively wide slot 95, the lower end of which is near the vertical centerline of the assembly, and the upper end of which is angularly spaced therefrom a slightly greater distance than the angular distance between successive feeding apertures 92 in the reel 27. The slot 95 is provided with an upper extension 96 of lesser width. When the feeding lever 20 is in its normal position as seen in Fig. 11 the claw 73 is retracted from the reel 27 by the opposite sides of the claw engaging the surface of the clamping plate 74 alongside of the slot extension 96 as seen in Fig. 12. When the feeding lever has been partially depressed the claw passes through the wide slot 95, permitting engagement thereof with the surface of the reel 27 until it drops into one of the feeding apertures 92. When the claw reaches the limit of its motion the reel has been advanced so that a pair of the transparencies mounted therein are in approximate alignment with the apertures 84. At this point the lugs 91 and 93 on the locating fingers press into other feeding apertures 92 in the reel and the inclined side surfaces of the lug slide the reel into exact registry with the clamping plate 74, the lugs holding the reel in projecting position when the claw is retracted. As seen in Fig. 17, the flange 79 is provided on the lower edge of the slot 95 and the claw 73 passes above the upper surface of the flange.

Adjustment of the images in the vertical sense is achieved as follows: The clamping plate 74 is provided with a cam follower extension 97 below the locating lug 91, the cam follower extension being displaced forwardly from the principal plane of the plate 74 and the displacement being continued along the lower edge of the plate to provide a stiffening flange 98. The substantially vertical cam follower edge of the extension engages an adjusting cam 99 which is fixed to the lever 23, the point of engagement thereof with the cam follower edge being substantially at the middle of the throw of the cam when the lever 23 is in its neutral position. The cam 99 is provided with an annular flange 100 (Fig. 10) which is rolled into firm engagement with a chamfered opening through the lever 23 so as to fix the cam 99 to the lever 23. The lever 23 is pivotally mounted upon a pivot 101 projecting forwardly from the rectangular mounting plate 25 into an opening through the cam, the pivot comprising a reduced, eccentric extension of a cylindrical plug 102 rotatably mounted in a snugly fitting opening in the mounting plate 25. The plug 102 is held in position on the plate 25 by a hexagonal head 103 thereon engaging the rear surface of the plate 25 and a spring washer 104 fixed to the inner end of the cylindrical plug and bearing against the opposite surface of the mounting plate 25. The hexagonal head 103 may be engaged and the plug rotated to adjust the position of the pivotal axis of the lever 23 during assembly of the apparatus. The lever 23 is held on the pivot 101 by a spring washer 105 which is fixed to a concentric reduced extension of the pivot 101 and engages a depressed surface of the cam 99. The cam follower extension 97 is urged against the surface of the cam 99 by a spring 106 having one end hooked into an opening in the tip of the extension 97 and the other end hooked about a pin 107 projecting forwardly from the mounting plate 25. It will be appreciated from the foregoing that movement of lever 23 upwardly from its neutral position will result in clockwise movement of the reel, thus vertically displacing the images in one direction, and movement of the lever 23 downwardly from the neutral position results in relative vertical displacement in the counterclockwise direction. The locating lugs 91 and 93 firmly engaged in reel apertures 92 positively effect rotation of the reel according to the adjustment of the lever 23. The narrower lug 93 permits positive rotational registry of the reel 27 despite any variations in spacing between the two feeding apertures engaged by lugs 91 and 93 due to manufacturing tolerances and reel warpage.

In order that the lever 23 may be returned to its neutral position at each advancing movement of the reel, the lever is provided with a forwardly projecting, cylindrical lug 108 which is provided with a screwdriver slot, and which has an eccentric stem 109 (Fig. 7) which snugly engages an opening through the lever 23 substantially along the longitudinal centerline of the lever. The opposite end of the eccentric stem 109 is peened over onto the rear surface of the lever in such manner that firm frictional engagement of the lever is achieved but a screwdriver may be used rotatably to adjust the position of the cylindrical lug 108 about the axis of the eccentric stem 109. The lower edge of the advancing lever 20 is provided with a finger 110 which, together with the lower edge of the tip portion 64 of lever 20, defines a notch 111 having inwardly converging side edges and the inner extremity of which is of a diameter snugly to embrace the cylindrical lug 108. If the lever 23 has been moved upwardly, the lower edge of the tip portion 64 moves it downwardly during a reel advancing movement until the lever is centered by the lug engaging in the notch 111, and the upper edge of the finger 110 achieves the same result in the opposite direction. The lug 108 also serves the purpose of limiting the feeding movement of the reel advancing claw 73 and for this reason its adjustment about the eccentric stem 109 is most important. Since this adjustment is paramount it is accomplished and then adjustment of the pivot 101 is accomplished in order that the adjusting throw of the cam 99 may be properly achieved.

Figure 18:
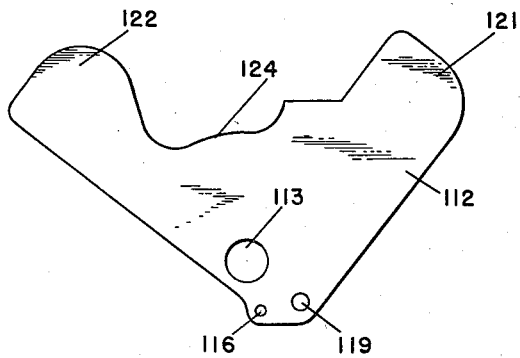
Fig. 18 is a front elevation of a shutter incorporated in the present invention.

In order that spectators may not be subjected to eyestrain while the reel is being shifted, a shutter 112 (Fig. 18) is pivotally mounted against the rear surface of the front mounting plate 26 (Fig. 25). The shutter is provided with a pivot opening 113 which is engaged on a pivot 114 having an outer flange overhanging the surface of the shutter and a reduced stem passing through an opening in the mounting plate 26 and retained by a snap ring 115. The shutter is provided with an aperture 116 into which is hooked one end of a shutter-operating spring 117. The spring 117 lies within a laterally extending slot 118 in the plate 26 and its opposite end is hooked into a small opening in the plate beyond the slot. Adjacent the end of the spring 117 the shutter is provided with a second hole 119 through which the reduced stem of a cylindrical lug 120 is passed (Fig. 22), the end thereof being peened over to fix the lug to the shutter. The shutter is somewhat triangular in shape and the two upper corners thereof define window-obscuring portions 121 and 122. The forward edge of the tip portion 64 of the lever 20 comprises a diagonally directed cam surface 123 which is closely adjacent the lug 120 when the lever 20 is in its normal position as seen in Fig. 19. In this position the spring 117 is contracted, holding an edge of the obscuring portion against the cylindrical surface of a reduced portion of the spacer 58 immediately adjacent the surface of the mounting plate 26. The initial downward movement of the lever 20 causes engagement of the cam surface 123 with the lug 120 and partial rotation of the shutter about its pivot 114 to such an extent that the obscuring portions 121 and 122 cover the apertures 87 and block the passage of light through the projector. The upper edge of the portion 64 of the lever 20 beyond the cam surface 123 is so shaped that the lug 120 and the shutter are held stationary during the remainder of the throw of the feeding lever. The obscuring action occurs before the feeding claw 73 engages the reel and the uncovering action occurs immediately before complete return of the feeding lever to its position of rest. An upper edge portion of the shutter indicated at 124 is so shaped as to underlie the enlarged outer portion of the spacer 58 whereby the shutter is maintained in proper position closely adjacent the inner surface of the plate 26.

It is to be observed at this point that although the spring 70 may be utilized to return the feeding lever 20 to its initial position, it is preferably of such strength merely to hold the feeding lever at the position illustrated in Fig. 14, at which point the rounded tips 62 of the spring fingers 60 and 61 engage the sloping sides of the projections 88 on the clamping plate 74, the lever being held in this position unless manually forced to its position of rest. At this position the lug 120 is still engaged with the upper surface of the portion 64 so that the shutter is held in obscuring position, and also, the clamping plate 74 is in released condition. Therefore, a reel may be withdrawn from the projector and replaced with another at this time without having the audience blinded by direct light from the bulb being flashed onto the screen. When the new reel is inserted, the lever 21 may be pushed downwardly to its full extent, thereby initially positioning one pair of transparencies in projecting position. The lever is then returned to the position of rest illustrated in Fig. 11, thus uncovering the projection windows and permitting the images to be projected onto the screen. This same action causes the reel to be firmly clamped between the plate 25 and the clamping plate 74 with the locating lugs in firm engagement with the feeding apertures in the reel. The operator quickly observes the images on the screen and makes whatever adjustment may be required by shifting the lever 23. Thereafter each feeding movement will be accomplished by the complete movement of the lever 20, each downward movement of the lever 20 shifting the reel to bring the next set of transparencies into proper position for projection and returning the lever 23 to neutral, and each complete upward movement of the lever 20 resulting in clamping of the reel so that adjustment may be effected through movement of the lever 23 if such adjustment should be necessary. After projecting the last of a series of pictures on one reel, the operator merely returns the lever 20 after depressing it to its full extent to the position of Fig. 14 to permit substitution of reels while the screen remains dark.

Upon the rear surface of the rectangular mounting plate 25 there is provided a polarizing filter holding plate 125 which is provided with offset portions at its ends through which screws 126 are threaded into the mounting plate 25 to hold the filter holding plate in spaced relation to the rear surface of the mounting plate. The plate 125 is provided with a pair of windows 127 of greater dimension than, but in alignment with, the windows 85 in the mounting plate. The edges of the openings 127 are provided with displaced tabs 128 which project rearwardly from the plane of the plate 125, and tabs 129 which are displaced forwardly, whereby polarizing filters 130 and 131 may be mounted in the windows 127. The filters are quite long so that they may be turned end for end in the event that one end portion should become discolored or otherwise affected by long exposure to the heat of the bulb, the inwardly directed portions of the filters being received in depressions 132 in the plate 125. The filters are locked in position by a protecting retainer plate 133 held against the surface of the plate 125 by a screw 134. The filter 130 may be so constituted as to polarize light in one oblique sense, while the filter 131 may be so constituted as to polarize the light in an opposite oblique sense, and the observers are to be supplied with spectacles having polarizing lenses correspondingly oriented so that each eye will see only one of the superimposed images in order to have the stereoscopic effect transmitted to the brain.

The rear wall of the removable cover portion 14 is preferably provided with an opening 135 adjacent its lower edge and through which light may pass from the bulb 13, the opening being shielded except in a downward direction by a reflecting flange 136 integral with the cover portion. This construction creates a soft light glow at the rear of the projector in order to enable the operator to read legends on the reels, and to view the projector controlling switch or switches (not shown) which are conveniently mounted at the rear of the projector.

The front mounting plate 26 is formed as a triangle with its apex directed downwardly so as to expose the clamping plate 74 and as much as possible of the rear mounting plate to cooling draft. Also, the side edges of the rear mounting plate are spaced from the adjacent walls of the housing to permit cooling air to flow around the assembly.

It is to be appreciated that the immediate embodiment of the projector is designed for projection of small, stereoscopic transparencies so mounted in a concentric circle about a reel that the centers of each pair of transparencies are spaced apart approximately the average human interpupillary spacing. In such a reel seven pairs of transparencies may be mounted as indicated by the designating letters "A" to "G," inclusive (Fig. 4), with each pair having a further character "R" standing for the right view of a pair and "L" standing for the left view of a pair. Each reel is provided with seven feeding apertures 92 so positioned as to lie along a diameter of the reel midway between alternate pairs of transparency holding apertures. Thus when the feeding claw 73 engages the aperture designated 92A, the first pair of transparencies $A_R$ and $A_L$ will be positioned in proper alignment for projection. The feeding apertures are so spaced that the next engagement of the feeding claw with the aperture 92B will advance the transparencies marked "B" to the projecting position. Every other transparency around the circumference of the reel is upside down with respect to its neighbors, so that when it is advanced to its projecting position it will be properly positioned for projecting. The apparatus of the present invention may be designed for larger reels of the same character by proper design.

Figure 4:
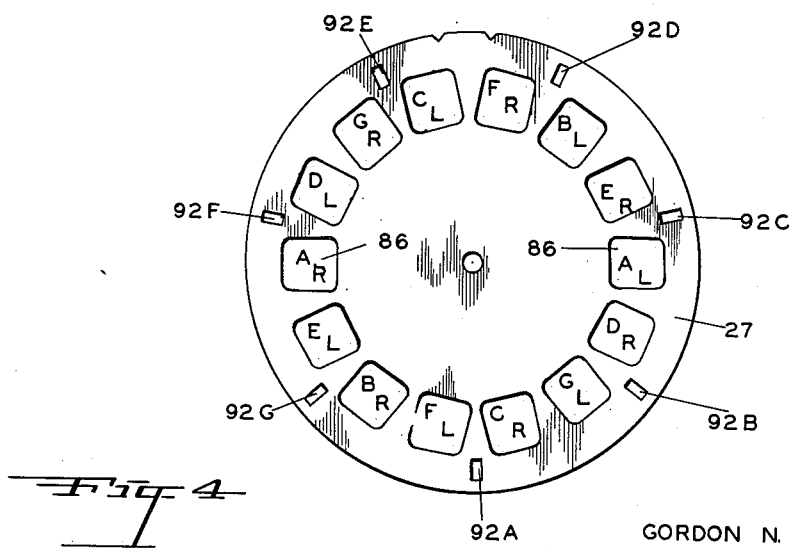
Fig. 4 is a plan view of a transparency-holding reel utilizable in the projector.

For convenience in terminology, a holder such as disclosed in Fig. 4 is described as mounting seven stereo-paired pairs of transparencies, by which it is meant that the right and left transparencies of each pair are maintained in a common plane, correctly oriented with the views properly positioned when disposed along a horizontal line passing through their centers, and with their centers properly spaced as determined by the optical principles involved in the camera for making the transparencies and the projector for projecting the images therefrom. The adjusting means rotatably adjusts the holder in either direction in the plane of the holder about the midpoint of the centerline of a pair of transparencies.

Having illustrated and described a preferred embodiment of the present invention, it should be apparent to those skilled in the art that the same permits of modification in arrangement and detail. I claim as my invention all such modifications as come within the true spirit and scope of the appended claims.

I claim:

1. A stereoscopic projector adapted to receive a disc holder mounting a plurality of stereo-paired pairs of transparencies and having a plurality of spaced feeding apertures therethrough, comprising a pair of resilient fingers each having a locating lug thereon engageable in one of said apertures to position said holder in proper position for projecting the superimposed images of a pair of the transparencies onto a viewing screen, feeding means engageable with said apertures rotatably to shift said holder and successively position pairs of transparencies in projecting position, adjusting means to adjust the relative positions of said fingers parallel to the plane of the holder in either direction rotatably about a point on the holder in order to adjust the relative positions of the projected images on the screen in the vertical sense, and cooperative means on said feeding means and said adjusting means to return said adjusting means to a neutral position during each feeding movement of the holder, one of said lugs substantially filling the holder aperture in both dimensions and the other of said lugs substantially filling the holder aperture only in one dimension.

2. A stereoscopic projector comprising shiftable means to receive and maintain a disc holder mounting a plurality of pairs of stereo-paired transparencies in proper position for projecting the superimposed images of the transparencies onto a viewing screen, feeding means engageable with said disc holder successively to position pairs of transparencies in proper position for projection, adjusting means to adjust said shiftable means parallel to the plane of the holder rotatably about a point on the holder in order to adjust the relative positions of the images on the screen in the vertical sense, and means effective during the operation of said feeding means to return said adjusting means and said shiftable means to a neutral position.

3. A stereoscopic projector of the type adapted successively to project images of a plurality of stereo-paired pairs of transparencies mounted in a concentric circle in a disc holder with the transparencies of each pair mounted at opposite sides of the holder along a diameter thereof comprising means including a clamping plate to maintain such a disc holder in proper position for projecting the superimposed images of a pair of transparencies mounted therein onto a viewing screen, means rotatably mounting said clamping plate for partial rotation about an axis normal to the plane of the holder, and manually adjustable cam means engaging said clamping plate at a distance from said axis adjustably to rotate said clamping plate in either direction about said axis in order to adjust the relative positions of the images on the screen in the vertical sense.

4. A stereoscopic projector comprising a housing having a transverse slot through a wall thereof, a mounting plate fixedly mounted in said housing, a clamping plate movably mounted on said mounting plate in substantially parallel, face-to-face relation thereto and spaced therefrom to define a space in alignment with said slot and into which a holder mounting a stereo-paired pair of transparencies may be inserted through said slot, guide means extending across said space and engageable with edge portions of said holder roughly to locate said holder in proper position for projecting the superimposed images of the transparencies onto a viewing screen, said plates having aligned windows therethrough to permit the passage of light through said transparencies, pivot means rotatably mounting said clamping plate for partial rotation in its own plane, resilient locating means mounted on said clamping plate and positively engaging said holder for fixing the position of said holder relative to said clamping plate, and means adjustably to rotate said clamping plate and the holder therewith in either direction about said pivot means whereby to adjust the relative positions of the images on the screen in the vertical sense.

5. A stereoscopic projector comprising a housing having a transverse slot through a wall thereof, a mounting plate fixedly mounted in said housing, a clamping plate movably mounted on said mounting plate in substantially parallel, face-to-face relation thereto and spaced therefrom to define a space in alignment with said slot and into which a holder mounting a stereo-paired pair of transparencies and having a spaced pair of apertures therethrough may be inserted through said slot, guide means extending across said space and engageable with edge portions of said holder roughly to locate said holder in proper position for projecting the superimposed images of the transparencies onto a viewing screen, said plates having aligned windows therethrough to permit the passage of light through said transparencies, pivot means rotatably mounting said clamping plate for partial rotation in its own plane, a pair of resilient locating fingers mounted on said clamping plate and extending across said space in such position as to engage a pair of the apertures in said holder for fixing the position of said holder relative to said clamping plate, a cam rotatably mounted on said mounting plate and engaging an edge of said clamping plate, a spring resiliently holding said clamping plate edge against said cam, and means adjustably to rotate said cam to move said clamping plate and the holder therewith in either direction about said pivot means whereby to adjust the relative positions of the images on the screen in the vertical sense.

6. A stereoscopic projector comprising a housing having a transverse slot in a wall thereof, a mounting plate fixedly mounted in said housing, a clamping plate movably mounted on said mounting plate in substantially parallel, face-to-face relation thereto, said plates defining a space in alignment with said slot into which a disc holder of the type having a plurality of pairs of stereo-paired transparencies mounted therein in a concentric circle with the transparencies of each pair on opposite sides of the center along a diameter thereof and a plurality of evenly spaced apertures concentrically spaced thereabout may be inserted through said slot, guiding means extending across said space and engageable with edge portions of said holder roughly to locate said holder in proper position for projecting the superimposed images of the transparencies mounted therein onto a viewing screen, said plates having horizontally aligned windows therethrough to permit the passage of light through said transparencies, feeding means engageable successively with said apertures to accomplish stepwise rotation of said holder in said space for presenting successive pairs of said transparencies to said windows, pivot means rotatably mounting said clamping plate for partial rotation in its own plane, a pair of resilient locating fingers mounted on said clamping plate, each of said fingers comprising a beveled locating lug engageable in one of said apertures to register said holder relative to said clamping plate at the end of each stepwise rotation of the holder, and cam means adjustably to rotate said clamping plate and the holder therewith about said pivot means whereby to adjust the relative positions of the images on the screen in the vertical sense.

7. A stereoscopic projector comprising a housing having a transverse slot in a wall thereof, a mounting plate fixedly mounted in said housing, a clamping plate movably mounted on said mounting plate in substantially parallel, face-to-face relation thereto, said plates defining a space in alignment with said slot and into which may be inserted a disc holder of the type having a plurality of pairs of stereo-paired transparencies mounted therein in a concentric circle with the transparencies of each pair on opposite sides of the center along a diameter thereof and a plurality of evenly spaced, concentrically positioned apertures therethrough, said plates having horizontally aligned windows therethrough to permit the passage of light through said transparencies, feeding means engageable successively with said apertures to accomplish stepwise rotation of said holder in said space for presenting said stereo-paired transparencies successively to said windows, pivot means mounting said clamping plate for limited rotation in its own plane and for limited movement toward and away from said mounting plate, a pair of resilient locating fingers mounted on said clamping plate, each of said fingers comprising a locating lug engageable in one of said apertures to fix the position of said holder relative to said clamping plate at the end of each stepwise rotation of the holder, said feeding means comprising a lever movable from a position of rest to an advanced position, cooperative means on said feeding means and said clamping plate for moving said clamping plate toward said mounting plate whereby to clamp said holder firmly in located position when said lever is at its position of rest, and cam means mounted on said mounting plate and engaging said clamping plate to rotate said clamping plate and the holder therewith about said pivot means whereby to adjust the relative positions of the images on the screen in the vertical sense.

8. A stereoscopic projector comprising a housing having a transverse slot in a wall thereof, a mounting plate fixedly mounted in said housing, a clamping plate movably mounted on said mounting plate in substantially parallel, face-to-face relation thereto, said plates defining a space in alignment with said slot and into which may be inserted a disc holder of the type having a plurality of pairs of stereo-paired transparencies mounted therein in a concentric circle with the transparencies of each pair on opposite sides of the center along a diameter thereof and a plurality of evenly spaced, concentrically positioned apertures therethrough, guide means extending across said space and engageable with spaced edge portions of said holder roughly to locate said holder in proper position for projecting the superimposed images of the stereo-paired transparencies mounted therein onto a viewing screen, said plates having windows therethrough to permit the passage of light through said transparencies, feeding means engageable successively with said apertures to accomplish stepwise rotation of said holder in said space for presenting said stereo-paired transparencies successively to said windows, pivot means mounting said clamping plate for limited rotation in its own plane and for limited movement toward and away from said mounting plate, a pair of resilient locating fingers mounted on said clamping plate and extending diagonally across said space and away from said slot so that a surface of an inserted holder may be engaged by said fingers, each of said fingers comprising a beveled locating lug engageable in one of said apertures to fix the position of said holder relative to said clamping plate at the end of each stepwise rotation of the holder, said feeding means comprising a lever movable from a position of rest to an advanced position, cooperative means on said feeding means and said clamping plate for moving said clamping plate toward said mounting plate whereby to clamp said holder firmly in located position when said lever is at its position of rest, cam means mounted on said mounting plate and engaging said clamping plate to rotate said clamping plate and the holder therewith about said pivot means whereby to adjust the relative positions of the images on the screen in the vertical sense, resilient lever returning means biased between said feeding means and said mounting plate to urge said feeding lever toward said position of rest, said resilient means being incapable of causing cooperative engagement of said cooperative means whereby said lever is arrested short of said position of rest when returned by said resilient means, and said locating fingers holding said clamping plate in spaced relation to said mounting plate when said lever is thus arrested short of its position of rest whereby holders may be freely substituted in said space.

9. A stereoscopic projector comprising a housing having a transverse slot in its upper wall, an upright mounting plate fixedly mounted in said housing, a clamping plate movably mounted on said mounting plate in substantially parallel, face-to-face relation thereto, said plates defining a space in alignment with said slot and into which may be inserted a disc holder of the type having a plurality of pairs of stereo-paired transparencies mounted therein in a concentric circle with the transparencies of each pair on opposite sides of the center along a diameter thereof and a plurality of evenly spaced, concentrically positioned apertures therethrough, guide means extending across said space and engageable with the periphery of said holder roughly to locate said holder in proper position for projecting the superimposed images of the stereo-paired transparencies mounted therein onto a viewing screen, said plates having horizontally aligned windows therethrough to permit the passage of light through said transparencies, feeding means engageable successively with said apertures to accomplish stepwise rotation of said holder in said space for presenting said stereo-paired transparencies successively to said windows, pivot means pivotally and slidably mounting said clamping plate for limited rotation in its own plane and for limited movement toward and away from said mounting plate, a pair of resilient locating fingers mounted on said clamping plate, each of said fingers having a beveled locating lug near its tip engageable in one of said apertures to fix the location of said holder relative to said clamping plate at the end of each stepwise rotation of the holder, said feeding means comprising a feeding lever movable from a position of rest to an advanced position, cooperative means on said feeding means and said clamping plate for moving said clamping plate toward said mounting plate whereby to clamp said holder in position when said lever is at its position of rest, cam means mounted on said mounting plate and engaging said clamping plate to rotate said clamping plate and the holder therewith about said pivot means whereby to adjust the relative positions of the images on the screen in the vertical sense, resilient means biased between said feeding means and said mounting plate automatically to return said feeding lever toward said position of rest, said resilient means being incapable of causing cooperative engagement of said cooperative means whereby said feeding lever is arrested at an intermediate position when returned by said resilient means, said locating fingers holding said clamping plate in spaced relation to said mounting plate when said lever is at said intermediate position whereby holders may be freely substituted in said space and also when said feeding lever is at or between said intermediate position and said advanced position whereby stepwise feeding movements of said holder may be freely accomplished, said cam means comprising an adjusting lever and a lug thereon, and said feeding lever having edge portions defining a notch in which said lug is seated to limit the feeding movement of said feeding lever to said advanced position, said edge portions converging toward each other whereby said adjusting lever is automatically returned to a neutral position during each feeding movement of said feeding means.

10. A stereoscopic projector adapted to receive a disc holder mounting a plurality of stereo-paired pairs of transparencies and having a plurality of spaced feeding apertures therethrough, comprising shiftably mounted maintaining means including a pair of resilient fingers each having a locating lug thereon engageable in one of said apertures to position said holder in proper position for projecting the superimposed images of a pair of the transparencies onto a viewing screen, feeding means engageable with said apertures rotatably to shift said holder and successively position pairs of transparencies in projecting position, adjusting means relatively to shift said resilient fingers parallel to the plane of the holder in either direction rotatably about a point on the holder in order to adjust the relative positions of the projected images on the screen in the vertical sense, and cooperative means on said feeding means and said adjusting means to return said adjusting means and said fingers to a neutral position during each feeding movement, one of said locating lugs substantially filling the holder aperture in both dimensions and the other of said lugs substantially filling the holder aperture only in one dimension, said locating lugs being positioned to engage apertures immediately adjacent the pair of transparencies in projecting position.

11. A stereoscopic projector comprising a housing having a transverse slot in a wall thereof, a mounting plate fixedly mounted in said housing, a clamping plate movably mounted on said mounting plate in substantially parallel, face-to-face relation thereto, said plates defining a space in alignment with said slot into which a disc holder of the type having a plurality of pairs of stereo-paired transparencies mounted therein in a concentric circle with the transparencies of each pair on opposite sides of the center along a diameter thereof and a plurality of evenly spaced apertures concentrically spaced thereabout may be inserted through said slot, guiding means extending across said space and engageable with edge portions of said holder roughly to locate said holder in proper position for projecting the superimposed images of the transparencies mounted therein onto a viewing screen, said plates having horizontally aligned windows therethrough to permit the passage of light through said transparencies, feeding means engageable successively with said apertures to accomplish stepwise rotation of said holder in said space for presenting successive pairs of said transparencies to said windows, pivot means rotatably mounting said clamping plate for partial rotation in its own plane, a pair of resilient locating fingers mounted on said clamping plate, each of said fingers comprising a beveled locating lug engageable in one of said apertures to register said holder relative to said clamping plate at the end of each stepwise rotation of the holder, and cam means adjustably to rotate said clamping plate and the holder therewith about said pivot means whereby to adjust the relative positions of the images on the screen in the vertical sense, said beveled locating lugs comprising one lug of a size and shape snugly to engage one of said apertures in the holder and the other of said lugs being of such size and shape as to engage one of said apertures in said holder in one dimension only.

12. A stereoscopic projector comprising a housing having a transverse slot in a wall thereof, a mounting plate fixedly mounted in said housing, a clamping plate movably mounted on said mounting plate in substantially parallel, face-to-face relation thereto, said plates defining a space in alignment with said slot into which a disc holder of the type having a plurality of pairs of stereo-paired transparencies mounted therein in a concentric circle with the transparencies of each pair on opposite sides of the center along a diameter thereof and a plurality of evenly spaced apertures concentrically spaced thereabout may be inserted through said slot, guiding means extending across said space and engageable with edge portions of said holder roughly to locate said holder in proper position for projecting the superimposed images of the transparencies mounted therein onto a viewing screen, said plates having horizontally aligned windows therethrough to permit the passage of light through said transparencies, feeding means engageable successively with said apertures to accomplish stepwise rotation of said holder in said space for presenting successive pairs of said transparencies to said windows, pivot means rotatably mounting said clamping plate for partial rotation in its own plane, a pair of resilient locating fingers mounted on said clamping plate, each of said fingers comprising a beveled locating lug engageable in one of said apertures to register said holder relative to said clamping plate at the end of each stepwise rotation of the holder, and cam means adjustably to rotate said clamping plate and the holder therewith about said pivot means whereby to adjust the relative positions of the images on the screen in the vertical sense, said cam means including an adjusting lever having a lug adjustably mounted thereon and engageable by said feeding lever to limit the movement of said feeding lever, an eccentric cam fixed to said adjusting lever and eccentric means mounting said cam on said mounting plate whereby the relative position of said eccentric cam with respect to said clamping plate may be adjusted.

13. A stereoscopic projector comprising a housing having a transverse slot in a wall thereof, a mounting plate fixedly mounted in said housing, a clamping plate movably mounted on said mounting plate in substantially parallel, face-to-face relation thereto, said plates defining a space in alignment with said slot into which a disc holder of the type having a plurality of pairs of stereo-paired transparencies mounted therein in a concentric circle with the transparencies of each pair on opposite sides of the center along a diameter thereof and a plurality of evenly spaced apertures concentrically spaced thereabout may be inserted through said slot, means engageable with said holder roughly to locate said holder in proper position for projecting the superimposed images of the transparencies mounted therein onto a viewing screen, said plates having horizontally aligned windows therethrough to permit the passage of light through said transparencies, feeding means including a feeding lever engageable successively with said apertures to accomplish stepwise rotation of said holder in said space for presenting successive pairs of said transparencies to said windows, pivot means rotatably mounting said clamping plate for partial rotation in its own plane, a pair of resilient locating fingers mounted on said clamping plate, each of said fingers comprising a beveled locating lug engageable in one of said apertures to register said holder relative to said clamping plate at the end of each stepwise rotation of the holder, cam means including an adjusting lever adjustably to rotate said clamping plate and the holder therewith about said pivot means whereby to adjust the relative positions of the images on the screen in the vertical sense, and cooperative means on said feeding means and said cam means to return said cam means to a neutral position upon each operation of said feeding means comprising a lug on said adjusting lever and edge portions on said feeding lever defining a notch in which said lug is engaged.

14. A stereoscopic projector comprising a housing having a transverse slot in a wall thereof, a mounting plate fixedly mounted in said housing, a clamping plate movably mounted on said mounting plate in substantially parallel, face-to-face relation thereto, said plates defining a space in alignment with said slot into which a disc holder of the type having a plurality of pairs of stereo-paired transparencies mounted therein in a concentric circle with the transparencies of each pair on opposite sides of the center along a diameter thereof and a plurality of evenly spaced apertures concentrically spaced thereabout may be inserted through said slot, and feeding means engageable successively with said apertures to accomplish stepwise rotation of said holder in said space for presenting successive pair of said transparencies to said windows, said feeding means comprising a feeding lever, and a claw resiliently mounted on said feeding lever, and said clamping plate being provided with an opening into which said claw may extend for engagement with said apertures, said opening being of lesser length than the distance through which said claw is moved whereby said claw is retracted from engagement with said holder when said feeding lever is at one end of its movement.

15. A stereoscopic projector of the type for successively projecting a plurality of stereo-paired transparencies concentrically mounted in a disc holder comprising a pair of substantially parallel plates defining a space into which a holder may be inserted, means on one of said plates for fixing the position of an inserted holder with respect to said one plate, means for moving said plates relatively toward and away from each other whereby the inserted holder may be clamped during projection and maintained loosely in said space at other times, and means for accomplishing stepwise rotation of the inserted holder for presenting stereo-paired transparencies mounted therein successively to projecting position within the projector comprising a lever movable from a position of rest through an intermediate position to an advanced position, said means for moving said plates relatively toward each other comprising cooperative means on said lever and on one of said plates effectively cooperative with each other only when said lever is at or between said position of rest and said intermediate position.

16. A stereoscopic projector adapted to successively project a plurality of stereo-paired transparencies mounted concentrically in a disc holder comprising a pair of substantially parallel plates defining a space into which a holder may be inserted for projection, means on one of said plates engageable with an inserted holder for fixing the position thereof with respect to said one plate, means mounting said one plate for movement toward the other in order to cdamp a holder therebetween and for limited rotation with respect to the other in order to adjust the relative positions of the projected images, means for accomplishing stepwise rotation of an inserted holder for presenting stereo-paired transparencies mounted therein successively to projecting position within the projector comprising a lever movable from a position of rest through an intermediate position to an advanced position, means to move said one plate relatively toward the other comprising cooperative means on said lever and on one of said plates effectively engageable with each other only when said lever is at said position of rest or between said position of rest and said intermediate position, means to move said one plate away from the other while said lever is at or between said intermediate position and said advanced position, and means rotatively to adjust the position of said one plate with respect to the other.

17. A stereoscopic projector adapted successively to project stereo-paired transparencies mounted in a disc holder provided with a plurality of concentrically arranged feeding apertures therethrough, comprising means including a pair of plates in face-to-face relation and defining a space in which a disc holder may be confined, one of said plates being stationary and the other of said plates being movably mounted for movement toward the stationary plate in order to clamp a holder therebetween, resilient means urging the movable plate away from the stationary plate in order that holders may be inserted into said space, a lever pivotally mounted externally of said space and adjacent said movable plate for pivotal movement about an axis normal to a holder confined in said space and coincident with the center of the holder, said lever being movable from a position of rest to an advanced position, a feeding claw mounted upon said lever, spring means constantly urging said claw toward said movable plate, said movable plate having an opening therethrough through which said claw may be projected by said spring means in order to engage the apertures in a holder confined in said space and effect stepwise rotation of the holder upon movement of said lever from said position of rest to said advanced position, means actuated by said lever when retracted to said position of rest to effect clamping movement of said movable plate, and means to retract said claw from engagement with said holder as said lever is being retracted to said position of rest.

18. A stereoscopic projector comprising means to confine a disc holder having stereo-paired transparencies mounted therein and provided with a plurality of concentrically arranged apertures therethrough, comprising a claw engageable with said apertures, means to effect arcuate movement of said claw when engaged in said apertures to effect stepwise rotation of said holder, locating means comprising a pair of locating lugs each engageable with one of a spaced pair of said apertures at the end of each stepwise movement of said holder, and means arcuately to move said lugs about a point on a holder engaged thereby in order to effect vertical adjustment of the superimposed images of a stereo-paired pair of transparencies created by the projector.

19. A stereoscopic projector of the type for projecting a plurality of stereo-paired transparencies concentrically mounted in a disc holder provided with a plurality of concentrically arranged apertures therethrough, comprising feeding means to rotate the disc holder step by step for presenting stereo-paired transparencies to a projection position, and a pair of resiliently mounted locating lugs engageable with a spaced pair of said apertures at the end of each feeding movement of the disc holder, one of said lugs being of the same width and breadth as the width and breadth of the apertures, and the other of said lugs being of the same width as the width of the apertures but being of lesser breadth than the breadth of the apertures.

20. A stereoscopic projector adapted to receive a disc holder mounting a plurality of stereo-paired pairs of transparencies and having a plurality of circumferentially arranged, evenly spaced feeding apertures therethrough, comprising a pivotally mounted, disc holder maintaining means including a pair of resilient fingers each having a locating lug thereon engageable in one of said apertures to position said holder in proper position for projecting the superimposed images of a pair of the transparencies onto a viewing screen, feeding means comprising a feeding lever pivotally mounted coaxially with a disc holder mounted on said maintaining means and movable through a feeding stroke and a feeding claw on said feeding lever engageable successively with said apertures rotatably to position successive pairs of transparencies in projecting position, adjusting means comprising a second lever and cam means fixed to said second lever and engaging said maintaining means adjustably to shift said maintaining means parallel to the plane of the holder in either direction rotatably about its pivotal mounting in order to adjust the relative positions of the projected images on the screen in the vertical sense, and cooperative means on said feeding means and said adjusting means engaging each other at the end of each feeding stroke of said feeding lever to return said adjusting means to a neutral position during each feeding movement of the holder.

21. A stereoscopic projector comprising pivotally shiftable means to receive and rotatably maintain a disc holder mounting a plurality of pairs of stereo-paired transparencies in proper, upright position for projecting the superimposed images of stereo-paired transparencies onto a viewing screen, feeding means comprising a feeding claw engageable with said disc holder and means to reciprocate said feeding claw arcuately for a limited distance about the center of a disc holder placed in said shiftable means whereby successively to position pairs of transparencies in proper horizontal alignment for projection, adjusting means including an adjusting lever and an eccentric fixed thereto and engaging said shiftable means to adjust said shiftable means parallel to the plane of the holder and rotatably about its center in order to adjust the relative positions of the projected images on the screen in the vertical sense, and means on said feeding means and engageable with said adjusting lever during each feeding movement of said feeding means to return said eccentric to a neutral position.

References Cited in the file of this patent

UNITED STATES PATENTS

| | | |
|---|---|---|
| 2,189,285 | Gruber | Feb. 6, 1940 |
| 2,365,547 | Hausherr | Dec. 19, 1944 |
| 2,511,334 | Gruber | June 13, 1950 |
| 2,525,598 | Gruber | Oct. 10, 1950 |
| 2,558,999 | Aldrich | July 3, 1951 |
| 2,571,584 | Kurz | Oct. 16, 1951 |
| 2,580,874 | Wottring | Jan. 1, 1952 |
| 2,598,573 | Lutes | May 27, 1952 |
| 2,625,078 | Smith | Jan. 13, 1953 |
| 2,653,511 | Correa | Sept. 29, 1953 |
| 2,701,981 | Rutt | Feb. 15, 1955 |